(12) United States Patent
Mironov

(10) Patent No.: US 8,469,694 B2
(45) Date of Patent: Jun. 25, 2013

(54) MOULD CLAMPING SYSTEM

(75) Inventor: Gabriel Mironov, Montreal (CA)

(73) Assignee: Suzhou Red Maple Wind Blade Mould Co. Ltd., Jiangsu (CN)

( * ) Notice: Subject to any disclaimer, the term of this patent is extended or adjusted under 35 U.S.C. 154(b) by 0 days.

(21) Appl. No.: 13/255,950

(22) PCT Filed: Mar. 12, 2010

(86) PCT No.: PCT/IB2010/051075
§ 371 (c)(1),
(2), (4) Date: Jan. 3, 2012

(87) PCT Pub. No.: WO2010/103490
PCT Pub. Date: Sep. 16, 2010

(65) Prior Publication Data
US 2012/0093964 A1   Apr. 19, 2012

(30) Foreign Application Priority Data

Mar. 13, 2009 (CN) ............... 2009 2 0006580 U
Sep. 10, 2009 (CN) ............... 2009 2 0177603 U

(51) Int. Cl.
*B29C 33/24* (2006.01)
(52) U.S. Cl.
USPC ............................................. 425/451.9
(58) Field of Classification Search
USPC .................................... 425/451.9, 595
See application file for complete search history.

(56) References Cited

U.S. PATENT DOCUMENTS

| | | | | |
|---|---|---|---|---|
| 2,776,854 A | * | 1/1957 | Billstrom | 292/256 |
| 3,199,159 A | * | 8/1965 | Wernecke | 425/595 |
| 3,734,661 A | * | 5/1973 | Joly-Pottuz et al. | 425/595 |
| 3,781,159 A | * | 12/1973 | Lidl | 425/595 |
| 3,825,396 A | | 7/1974 | Kontz | |
| 4,248,583 A | * | 2/1981 | Hedke et al. | 425/451.9 |
| 4,555,228 A | * | 11/1985 | Nishiike et al. | 425/185 |
| 4,810,182 A | * | 3/1989 | Groll | 425/595 |
| 4,828,478 A | * | 5/1989 | Hehl | 425/595 |
| 5,238,387 A | * | 8/1993 | Hama et al. | 425/451.9 |
| 6,264,458 B1 | * | 7/2001 | Marcuz et al. | 425/451.9 |
| 6,702,566 B1 | * | 3/2004 | Bellasalma et al. | 425/451.9 |

FOREIGN PATENT DOCUMENTS

| | | |
|---|---|---|
| CN | 201357533 Y | 12/2009 |
| DE | 19649503 A1 | 6/1998 |
| JP | 61-239926 A | 10/1986 |

OTHER PUBLICATIONS

The International Search Report in PCT/IB2010/051075 mailed Jul. 22, 2010.

* cited by examiner

*Primary Examiner* — James Mackey
(74) *Attorney, Agent, or Firm* — Novak Druce Connolly Bove & Quigg LLP

(57) ABSTRACT

A mould clamping system (1,101) for a mould (2,102) having a first half part and a second half part includes a first portion (4,104) and a second portion (5,105) coupled to the first and second half parts of the mould (2,102) respectively. The first portion (4,104) is provided with a first engaging part (41, 141), and the second portion has a second engaging part (6,106) which is movable, by means of a predetermined actuating means (7,107), between a first operating position where the second engaging part (6,106) is engaged with the first engaging part (41,141), and a second rest position where the second engaging part (6,106) is disengaged with the first engaging part (41,141). The clamping system (1,101) of the present invention eliminates the labor of installing the clamping systems, and ensures sufficient clamping force.

17 Claims, 8 Drawing Sheets

MOULD CLAMPING SYSTEM

TECHNICAL FIELD OF THE INVENTION

The present invention relates to a clamping device for a mould, especially for a large composite mould such as a wind turbine blade mould.

BACKGROUND OF THE INVENTION

It has always been a challenge for manufacturers of large composite parts, particularly wind turbine blades, to clamp together the two halves of their large moulds. Various types of manual clamps have been tried, such as:
1. C clamps.
2. Toggle clamps.
3. Simply bolting together the two halves.

However such methods are laborious, do not provide equal clamping force, and rely on careful workers for proper application and removal.

SUMMARY OF THE INVENTION

The aim of the present invention is to allow fully automatic clamping to be realized without any manual intervention. This eliminates the labor of installing the clamping devices, ensures that sufficient clamping is applied, and prevents any possibility that the workers will forget to remove the clamping devices once the bonding process is completed.

According to one aspect of the present invention, there is provided a clamping device for a mould having a first half part and a second half part, wherein the clamping device includes a first portion and a second portion coupled to the first and second half parts of the mould respectively, and the first portion is provided with a first engaging part, and the second portion has a second engaging part which is movable, by means of a predetermined actuating means, between a first operating position where the second engaging part is engaged with the first engaging part, and a second rest position where the second engaging part is disengaged with the first engaging part.

In one aspect of the present invention, the first engaging part is a hook part, and the second engaging part is a head of a clamping link.

In one aspect of the present invention, the second portion has a housing with at least one side opened to which a cover is removably attached, the cover only covering a part of the opened side so as to leave an opening allowing protruding of the head of the clamping link out of the housing, and being shaped and sized not to interfere with the clamping link when the clamping link is moved from the first operating position to the second rest position or vice verse.

In one aspect of the present invention, the housing is made of metal sheets, and has a shape of rectangular parallelepiped.

In one aspect of the present invention, in each of two opposite side walls of the housing, an upper guide slot and a lower guide slot are formed, and the two upper guide slots and the two lower slots in opposite side walls of the housing are adapted to receive an upper guide pin and a lower guide pin coupled to the clamping link, respectively, so as to allow the two guide pins to slide therein.

In one aspect of the present invention, the upper guide slot, the lower guide slot and the clamping link is designed such that, when the clamping link receives a force applied upwards to thus start moving upwards as a whole, with a cooperation between the guides pins and the guide slots, the head of the clamping link is moved to disengage with the hook of the first portion; and when the clamping link receives a force applied downwards to thus start moving downwards as a whole, with the cooperation between the guides pins and the guide slots, the head of the clamping link is moved to engage with the hook of the first portion.

In one aspect of the present invention, the clamping link has a "Z" shape composed of a lower segment running vertically, a horizontal middle segment following the lower segment, and said head following the middle segment and running vertically upwards, and wherein the lower segment and middle segment are housed in the housing, and the head protrudes out of the housing to engage with the hook.

In one aspect of the present invention, the head has a "C"-shaped profile whose tip is to be engaged with the hook.

In one aspect of the present invention, the upper guide slot is formed as two straight segments jointed by a curved portion, one of the two straight segments being orientated vertically and the other extending outwards and upwards, and wherein the lower guide slot is formed as a vertically orientated slot.

In one aspect of the present invention, the actuating means is a cylinder having a main body as a base member and an output member displaceable relative to the main body, one of the main body and the output member being connected to the housing and the other of the main body and the output member being connected to the clamping link so that the cylinder can operate to apply force to the clamping link.

In one aspect of the present invention, the cylinder is a type of applying a clamping force in retraction.

In one aspect of the present invention, the housing is provided with an access hole to provide passages for operating circuits or controlling means of the cylinder.

In one aspect of the present invention, the first portion and the second portion of the clamping device are coupled to a first member and a second member of a mould aligning device which are in turn coupled to the two half parts of the mould and are displaceable relative to each other.

Another aspect of the present invention provides that the first engaging part is a pin, and the second engaging part has a clamping link with a hook, wherein the clamping link is movable, by means of the predetermined actuating means, between the first operating position where the hook is engaged with the pin, and the second rest position where the hook is disengaged with the pin.

This aspect can provided the technical advantage that the size of the clamping device is reduced.

Preferably, the second engaging part has a housing provided with upper and lower guide slots.

Preferably, two guide pins are inserted through the upper and lower holes of the clamping link and slide in the upper and lower guide slots respectively.

Preferably, neither of the guide slots is completely straight, and each comprises a straight portion joined to a curved portion.

Preferably, the cylinder is mounted with the housing and thus is protected from paste and resin.

Preferably, the hook of the clamping link is shaped as curved ears to engage with the pin of the first part and to allow the cylinder to be located near to the mould.

Preferably, the pin of the first engaging part is cantilevered therefrom.

The clamping device of the various embodiments of the present invention may eliminate the labor of installing the clamping devices, ensures that sufficient clamping is applied, prevents any possibility that the workers will forget to remove the clamping devices once the bonding process is completed, and provides constant clamping force, independent of time or clamping displacement.

BRIEF DESCRIPTION OF THE DRAWINGS

FIG. 4 is a side view of the clamping device according to the first embodiment of the present invention in an assembled state.

DETAILED DESCRIPTION OF PREFERRED EMBODIMENTS

Hereinafter a first preferred embodiment of the present invention will be described with reference to FIGS. 1 to 4 of the drawings.

Figure 1:
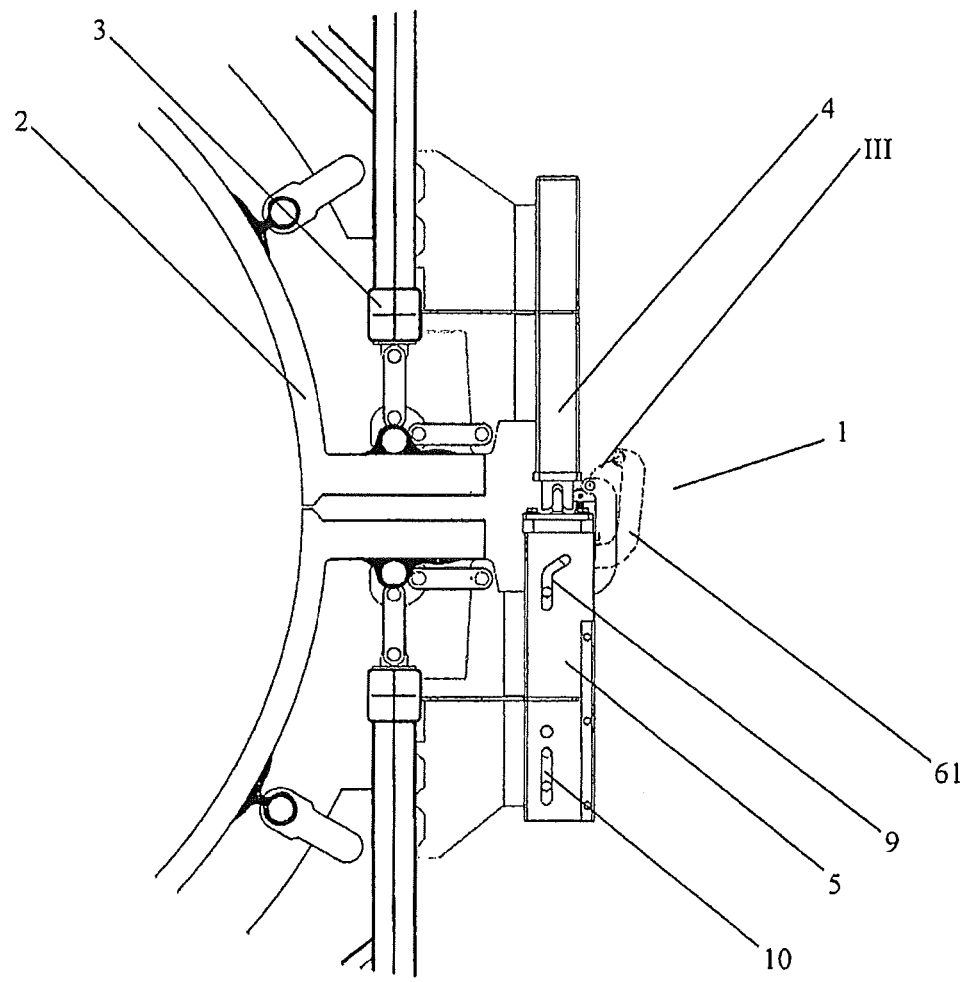
FIG. 1 is an end view illustrating a clamping device in accordance with a first embodiment of the present invention, coupled to a mould.

As shown in FIG. 1, a clamping device 1 according to the present invention is mounted to a periphery coupling region of two half parts of a mould 2 (especially a mould for wind turbine blades). The mould 2 is mounted onto a frame 3.

Figure 2:
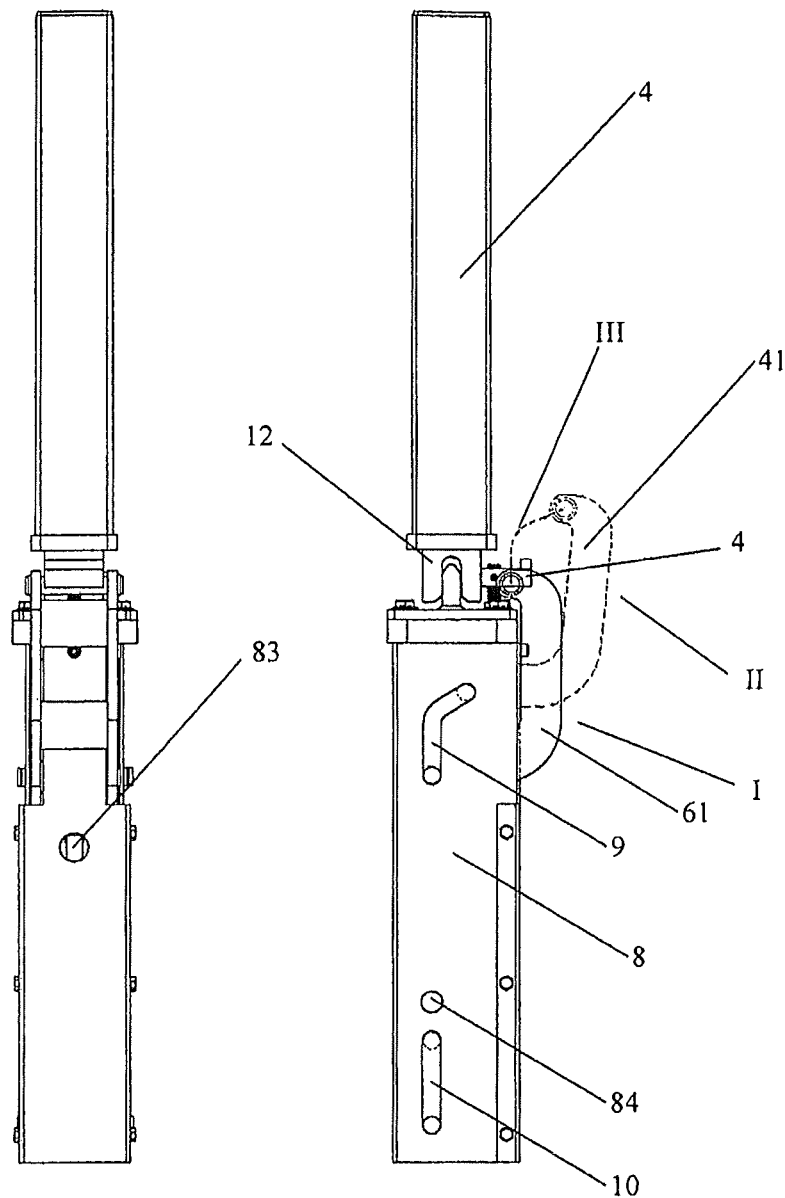
FIG. 2 is a front view of the clamping device according to the first embodiment of the present invention, especially showing two positions of the clamping link with continuous lines and dash lines respectively.

As shown in FIGS. 1 and 2, the clamping device 1 includes a first portion 4 and a second portion 5 coupled to the two half parts of the mould 2 respectively. The first portion 4 is provided with a hook 41, and the second portion 5 has a clamping link 6 which is movable, by means of a predetermined actuating means, between a first operating position I (as illustrated in continuous lines) where a head 61 of the clamping link 6 is engaged with the hook 41, and a second rest position II (as illustrated in dash lines) where the head 61 is disengaged with the hook 41. The predetermined actuating means may be for example a cylinder 7, as shown in FIG. 3, which will be described in details hereinafter.

Figure 3:
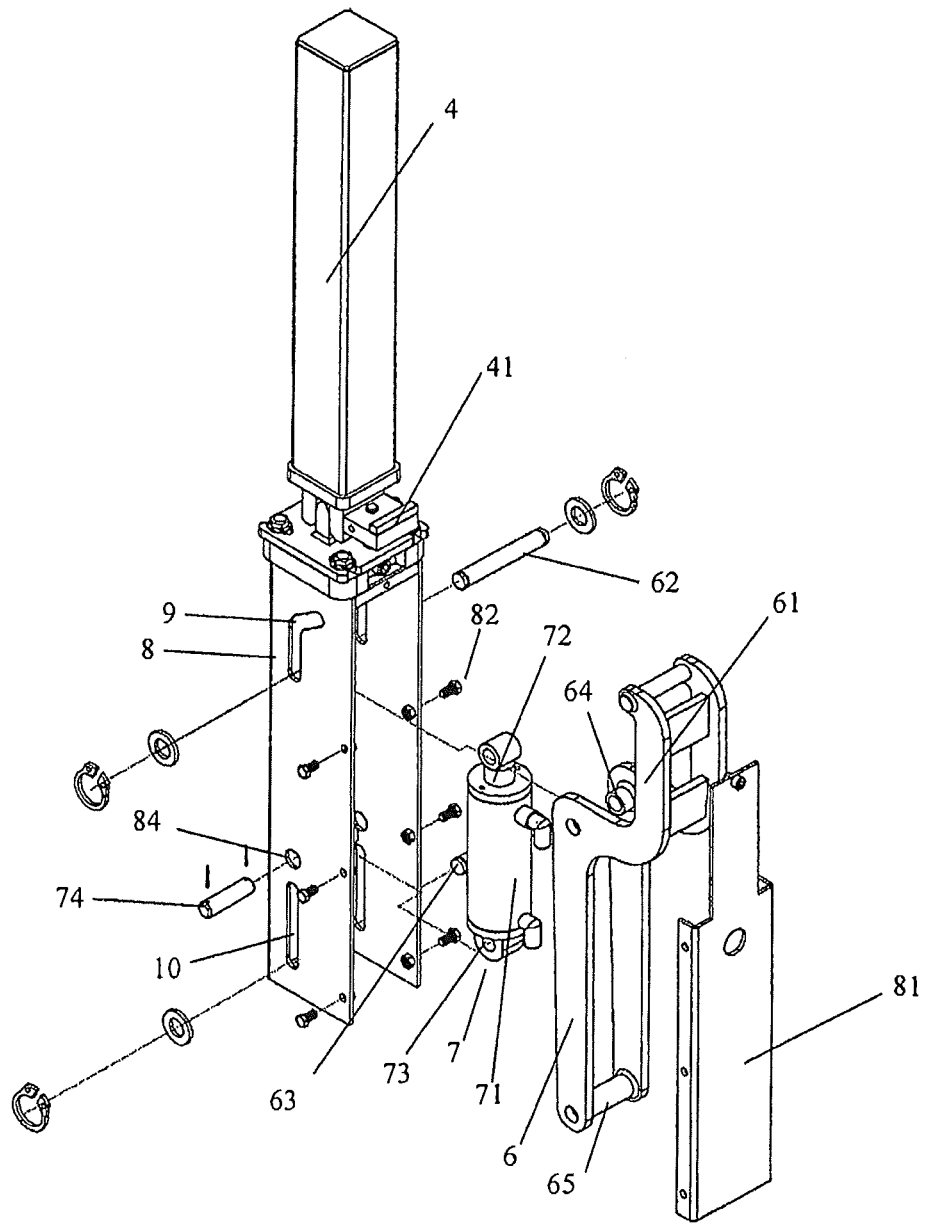
FIG. 3 is an exploded perspective view of the clamping device according to the first embodiment of the present invention.

As shown in FIGS. 2 and 3, the second portion 5 has a housing 8 which is preferably made of metal sheets. Preferably, the housing 8 has a shape of rectangular parallelepiped, and has at least one side opened to thus facilitate mounting or dismounting internal components, etc. A cover 81 is removably attached to the opened side(s), by means of screws 82 for example, so as to cover the opened side(s). However, the cover 81 only covers a part of the opened side so as to allow protruding of the head 61 of the clamping link 6 out of the housing 8 through uncovered portions of the opened side, as discussed in details here below. Additionally, the cover 81 is shaped and sized not to interfere with the clamping link 6 when the clamping link 6 is moved from the first operating position to the second rest position or vice verse.

As shown, in each of two opposite side walls of the housing 8, guide slots, i.e., an upper guide slot 9 and a lower guide slot 10 are formed. The two upper guide slots 9 and the two lower slots 10 in opposite side walls of the housing 8 are adapted to receive an upper guide pin 62 and a lower guide pin 63 coupled to the clamping link 6, respectively, so as to allow the two guide pins to slide therein.

The upper guide slot 9, the lower guide slot 10 and the clamping link 6 may be designed such that, when the clamping link 6 receives a force applied upwards to thus start moving upwards as a whole, with a cooperation between the guides pins and the guide slots, the head 61 of the clamping link 6 is moved to disengage with the hook 41 of the first portion 4; and when the clamping link 6 receives a force applied downwards to thus start moving downwards as a whole, with the cooperation between the guides pins and the guide slots, the head 61 of the clamping link 6 is moved to engage with the hook 41 of the first portion 4.

In the case of the embodiment as shown, the clamping link 6 generally has a "Z" shape composed of a lower segment running vertically, a horizontal middle segment following the lower segment, and an upper segment (i.e., head 61) following the middle segment and running vertically upwards. The lower segment and middle segment are to be housed in the housing 8, and the upper segment protrudes out of the housing 8 to engage with the hook 41. In this embodiment, the upper segment or head 61 has a "C"-shaped profile whose tip is to be engaged with the hook 41. It is apparent for those skilled in the art that the clamping link 6 might be implemented as various shapes as required without departing from the spirit of the present invention.

Further, in the illustrated embodiment, since a surface of the hook 41 to be engaged with the head 61 faces towards the mould (instead of away from the mould), in order to disengage with the hook 41, the clamping link 6 might be firstly moved upwards and then outwards so that the head 61 for example describes a curved track as indicated by reference sign III in FIGS. 1 and 2, or might be firstly moved inwards slightly, then upwards and then outwards (not shown). On the other hand, in order to engage with the hook 41, the clamping link 6 might be firstly moved inwards and then downwards or might be firstly moved inwards, then downwards and then outwards slightly.

In order to obtain the curved track of the head 61 as indicated by reference sign III, the upper guide slot 9 may be formed as two straight segments jointed by a curved portion. One of the two straight segments is orientated vertically and the other extends outwards and upwards. The lower guide slot 10 is formed as a vertically orientated slot.

Further, although in FIG. 3 the clamping link 6 is shown to be formed by two half sheet members connected by discrete connecting members to thus reserve a sufficient space between the two half sheet members for accommodating the cylinder 7, the clamping link 6 may be freely designed as desired. The clamping link 6 may be provided with holes 64 or sleeves 65 through which the upper guide pin 62 and the lower guide pin 62 may be inserted to thus attach the clamping link 6 to the housing 8.

As mentioned above, the clamping device 1 according to the present invention is provided with a cylinder 7 to actuate the clamping link 6. The cylinder 7 has a main body 71 as a base member and an output member 72 displaceable relative to the main body 71. One of the main body 71 and the output member 72 (e.g., main body 71 in the illustrated embodiment) is connected to the housing 8 (for example by means of pins 74 passing through a mounting sleeve 73 at an end of the main body 71 and through positioning holes 84 in the side walls of the housing 8, and corresponding fasteners), and the other of the main body 71 and the output member 72 (e.g., output member 72 in the illustrated embodiment) is connected to the clamping link 6, so that the cylinder 7 may operate to apply force to the clamping link 6. Preferably, the cylinder 7 is a type of applying a clamping force in retraction. Parameters of the cylinder may be determined depending upon requirements and sizes of the mould. For example, the cylinder may have a diameter ranged from 30 mm to 60 mm, and may apply a force of 500-3000 kgf.

The housing 8 is further provided with an access hole to provide passages for operating circuits or controlling means of the cylinder 7. In the illustrated embodiment, such an access hole 83 is formed in the cover 8, as shown in FIGS. 3 and 4.

The clamping device 1 according to the present invention might also cooperate with a mould aligning device 12. The mould aligning device 12 may for example include a first member and a second member which are coupled to the first and second half parts of the mould respectively and are movable relative to each other. The clamping device 1 according to the present invention may have its first portion 4 and second portion 5 coupled to the first member and the second member of the mould aligning device. Alternatively, the mould aligning device may incorporate the detailed structure or function of the first portion 4 and the second portion 5 of the clamping device 1 into the first and second members thereof. Thus, after alignment of the mould by means of the mould aligning device, the clamping device 1 may be operated to engage the head 61 of the clamping link 6 with the hook 41 to thus secure the two half parts of the mould together.

Hereinafter a second preferred embodiment of the present invention will be described with reference to FIGS. 5 to 9 of the drawings.

Figure 5:
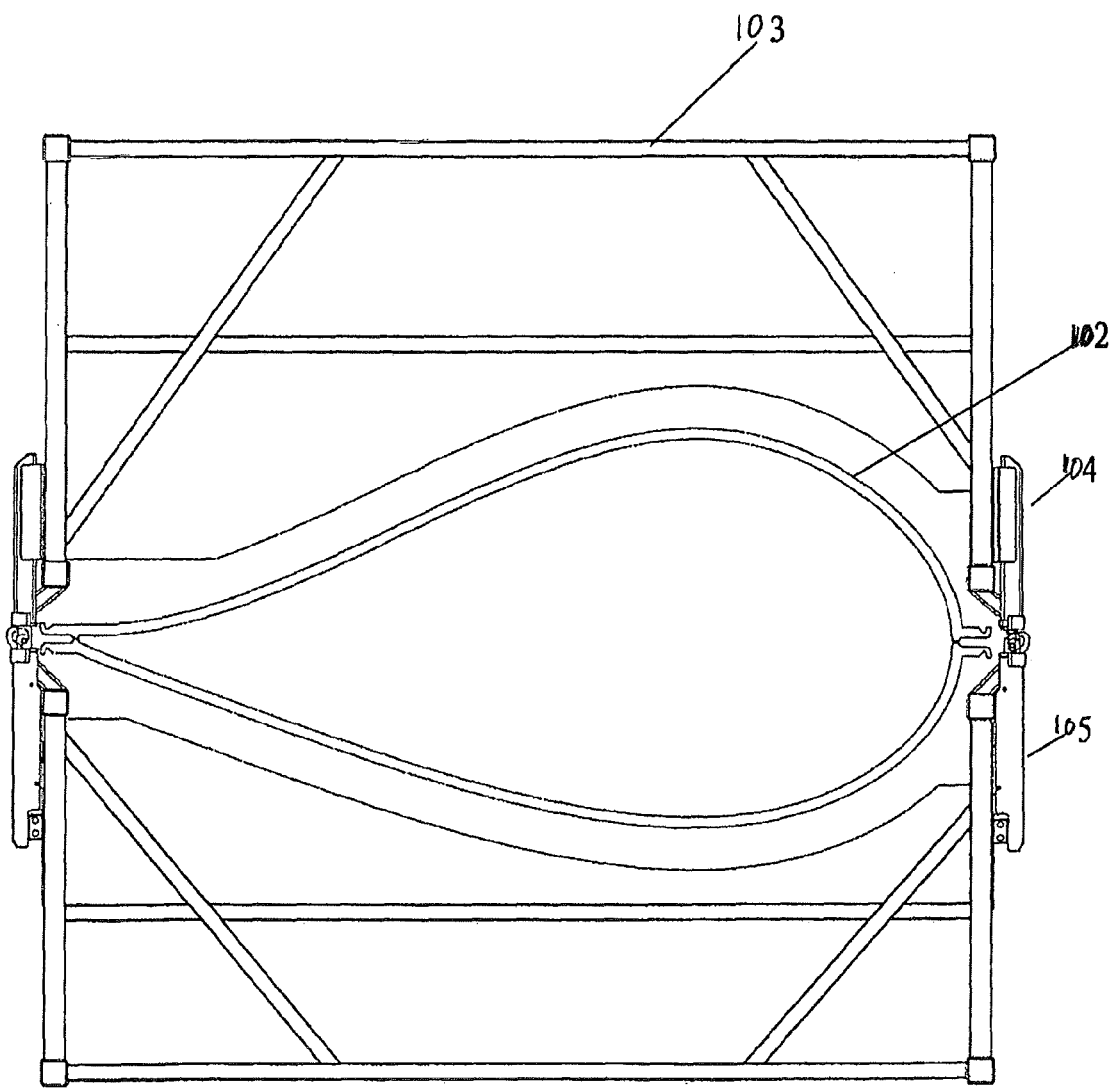
FIG. 5 is a side view illustrating a clamping device in accordance with a second embodiment of the present invention, coupled to the mould.
Figure 6:
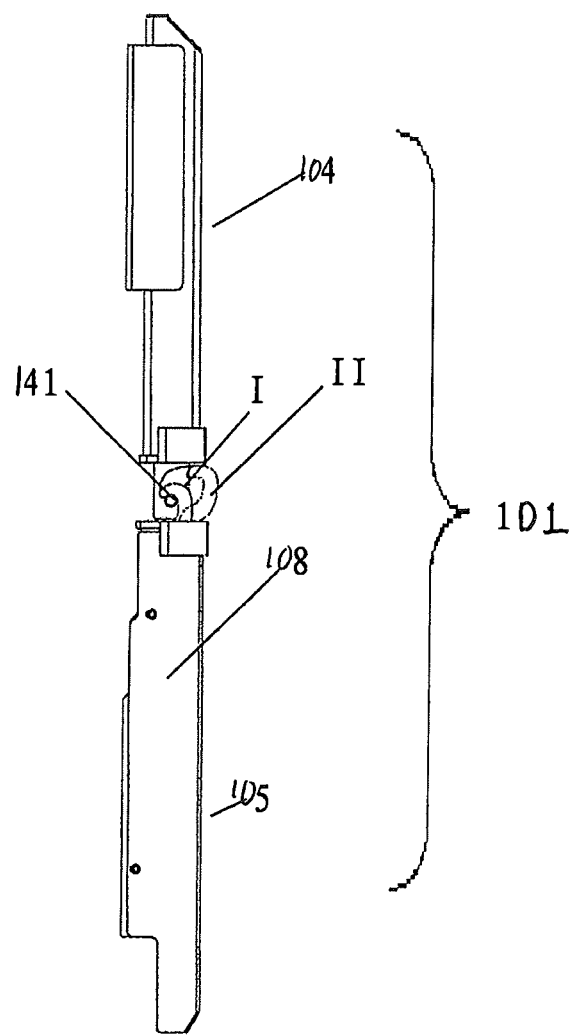
FIG. 6 is a side view of the clamping device according to the second embodiment of the present invention, especially showing two positions of the clamping link with continuous lines and dash lines respectively.

As shown in FIGS. 5 and 6, a clamping device 101 according to the second embodiment of the present invention is mounted to a periphery coupling region of two half parts of a mould 102 (especially a mould for wind turbine blades). The mould 2 is mounted onto a frame 103.

As shown in FIGS. 5 and 6, the clamping device 101 includes a first part 104 and a second part 105 coupled to the two half parts of the mould 102 respectively. The first part 104 is provided with a pin 141, and the second part 105 has a clamping link 106 (shown in FIG. 8) which is movable, by means of a predetermined actuating means, between a first operating position I (as illustrated in continuous lines) where a hook 161 of the clamping link 106 is engaged with the pin 141, and a second rest position II (as illustrated in dash lines) where the hook 161 is disengaged from the pin 141. The predetermined actuating means may be for example a cylinder 107 (as shown in FIG. 8), which will be described in details hereinafter.

Figure 7:
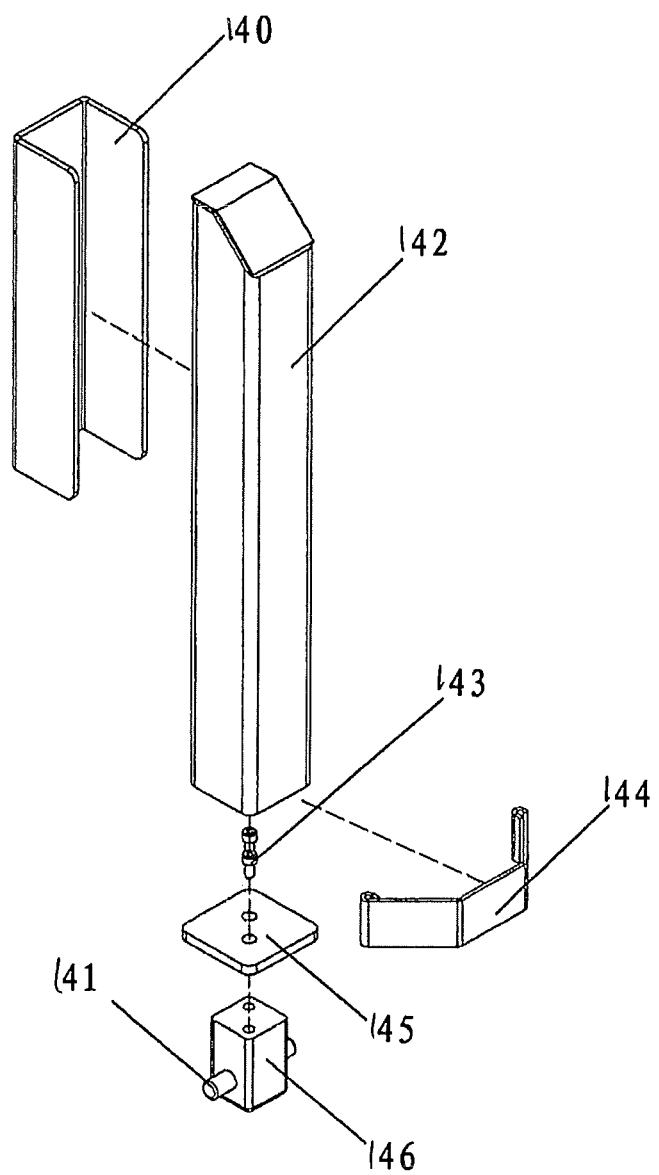
FIG. 7 is an exploded perspective view of the first part of the clamping device according to the second embodiment of the present invention.

As shown in FIG. 7, the first part has a mounting base 140 that will be fixed to the first half of the mould, an upper rectangular tube 142 that is mounted to the mounting base, a bumper block 146 from which the pin 141 is cantilevered and a cover plate 145 for covering the bumper block. The cover plate 145 and the bumper block 146 are connected to the tube 142 by means of the fixing bolts 143 for example.

Figure 8:
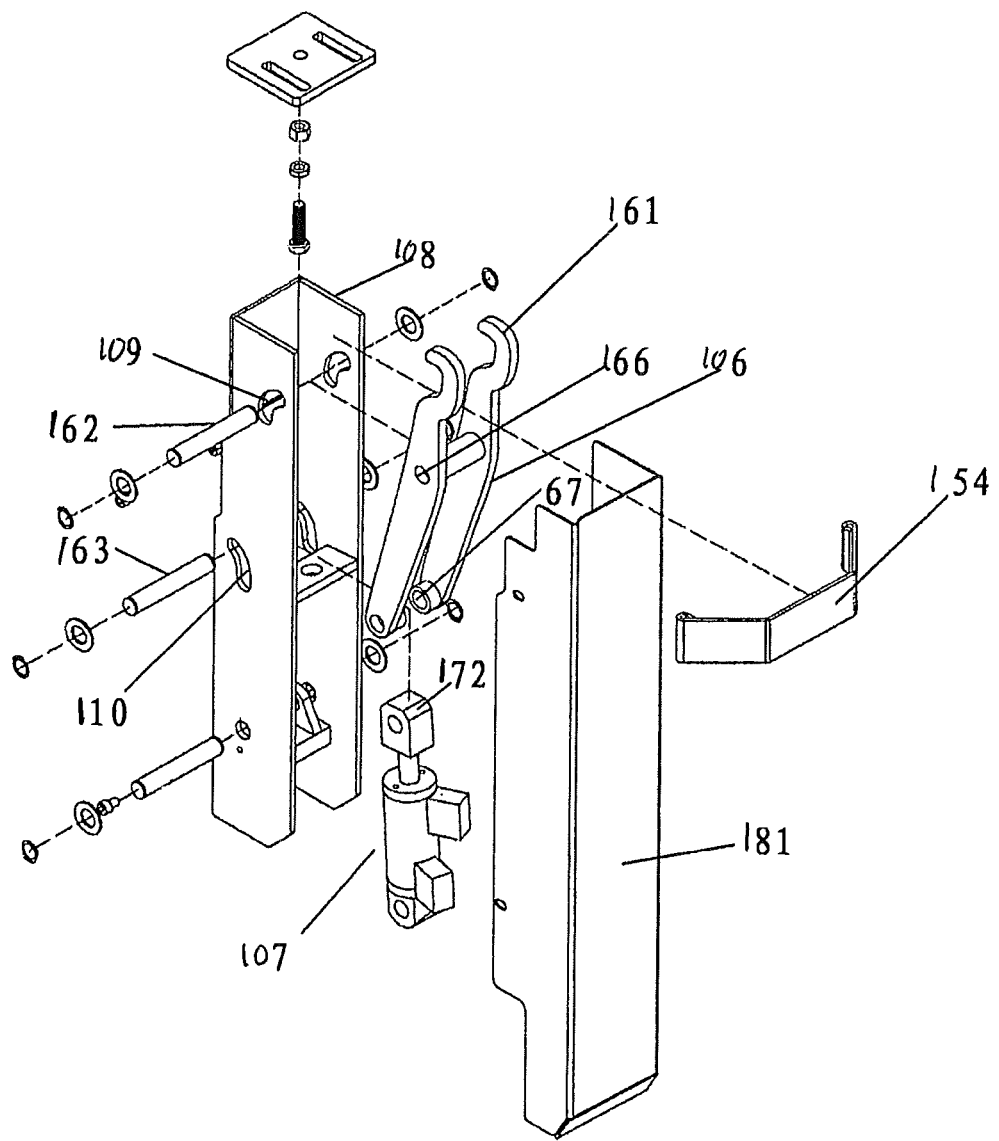
FIG. 8 is an exploded perspective view of the second part of the clamping device according to the second embodiment of the present invention.
Figure 9:
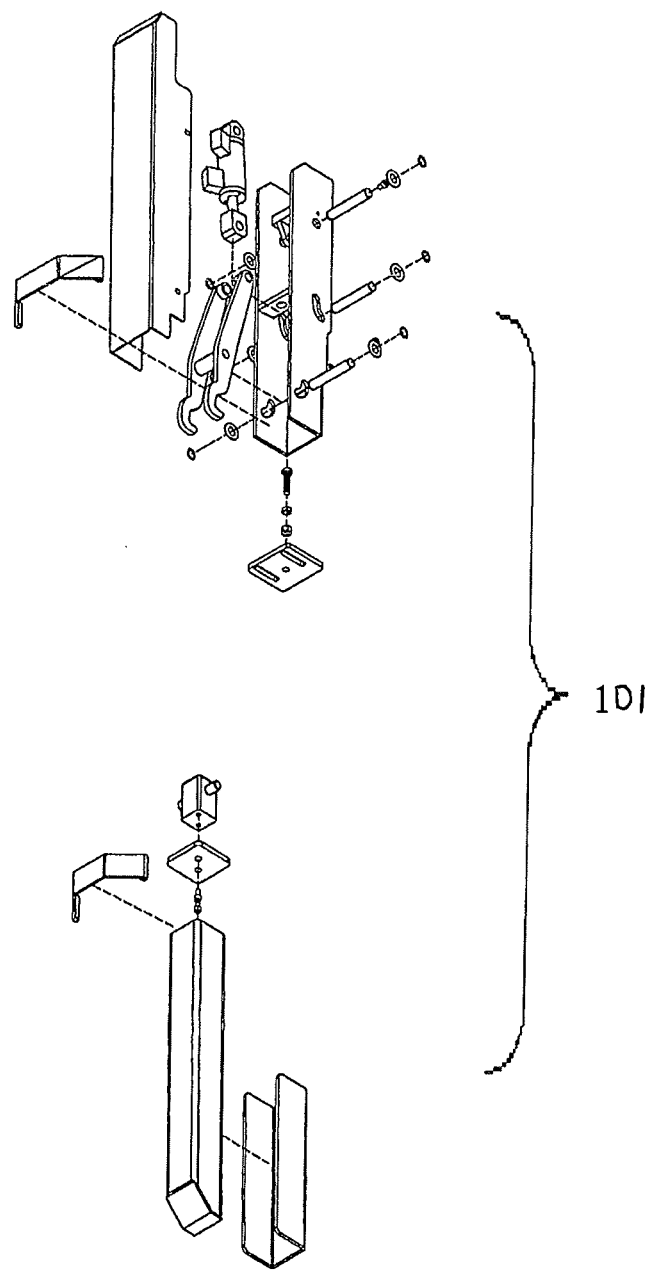
FIG. 9 is an exploded perspective view of the clamping device according to the second embodiment of the present invention.

As shown in FIG. 8, the second part 105 has a housing 108 which is preferably made of metal sheets. Preferably, the housing 108 has a shape of rectangular parallelepiped, and has at least one side opened to thus facilitate mounting or dismounting internal components, etc. A cover 181 is removably attached to the opened side(s), by means of screws for example, so as to cover the opened side(s). However, the cover 181 only covers a part of the opened side so as to allow the hook 161 of the clamping link 106 out of the housing 108 through uncovered portions of the opened side, as discussed in details hereinbelow. Additionally, the cover 181 is shaped and sized not to interfere with the clamping link 106 when the clamping link 106 is moved from the first operating position to the second rest position or vice versa.

As shown, in each of two opposite side walls of the housing 108, guide slots, i.e., an upper guide slot 109 and a lower guide slot 110 are formed. The upper guide slot 109 and the two lower slot 110 are adapted to receive an upper guide pin 162 and a lower guide pin 163 inserted through the mounting holes 166 of the clamping link 106, respectively, so as to allow the two guide pins to slide therein.

The upper guide slot 109, the lower guide slot 110 and the clamping link 106 may be designed such that, when the clamping link 106 receives a force applied upwards to thus start moving upwards as a whole, with a cooperation between the guides pins and the guide slots, the hook 161 of the clamping link 106 is moved to disengage with the pin 141 of the first part 104; and when the clamping link 106 receives a force applied downwards to thus start moving downwards as a whole, with the cooperation between the guides pins and the guide slots, the hook 161 of the clamping link 106 is moved to engage with the pin 141 of the first part 104.

In the case of the embodiment as shown, the clamping link 106 is composed of a inclined lower segment and an upper segment integral with the lower segment and shaped as hook 161, that is the clamping link is not straight, but has a curved upper portion. With this configuration, the hydraulic cylinder 107 can be located near to the mould and thus reduce the overall amount of space needed for the clamping device. The lower segment is to be housed in the housing 108, and the upper segment protrudes out of the housing 108 to engage with the pin 141. In this embodiment, the upper segment or hook 161 is shaped as slotted ears so that the slots of the ears are engaged with the pin 141. It is apparent for those skilled in the art that the clamping link 106 might be implemented as various structures as required without departing from the scope of the present invention as long as it can engage with the pin 141 in the first position and disengage from the pin in the second position.

Further, in the second illustrated embodiment, in order to prevent the hook from hurting the worker when it is disengaged from the pin 141, the first part and the second part both are provided with worker safety deflectors, i.e. the upper worker safety deflector 144 and the lower worker safety deflector 154.

The upper guide slot 109 and the lower guide slot 110 are designed that neither one is completely straight and both features straight portion joined to a curved portion. This causes the motion of the hook to describe a straight line, followed by an outwards arc when the mould should be opened and the hook is disengaged from the pin 141.

As mentioned above, the clamping device 101 according to the second embodiment of the present invention is provided with a cylinder 107, which is mounted within the housing 108, to actuate the clamping link 106. When the lower guide pin 163 is inserted to the lower hole 167 of the clamping link 106, it also passes through the output member 172 of the cylinder so that the cylinder is connected to the clamping link 106. Thus, the cylinder 107 may operate to apply force to the clamping link 106. Preferably, the cylinder 107 is a type of applying a clamping force in retraction. Parameters of the cylinder may be determined depending upon requirements and sizes of the mould. For example, the cylinder may have a diameter ranged from 30 mm to 60 mm, and may apply a force of 500-3000 kgf.

In the preferable embodiment, the housing can serve both to protect the cylinder from the paste and resin, and to package the second part 105, including integration of the sliding slots and the lower fixing point for the cylinder.

A person skilled in the art can contemplate many modifications within the scope of the present invention. These modifications all fall in the scope of the present invention as defined by the attached claims.

What is claimed is:

1. A clamping device for a mould having a first half part and a second half part, wherein the clamping device includes a first portion and a second portion coupled to the first and second half parts of the mould respectively, and the first portion is provided with a first engaging part, and the second portion has a second engaging part which is movable, by means of an actuating means, between a first operating position where the second engaging part is engaged with the first engaging part, and a second rest position where the second engaging part is disengaged with the first engaging part, wherein the first engaging part is a hook part, and the second engaging part is a head of a clamping link, and wherein the second portion has a housing with at least one side opened to which a cover is removably attached, the cover only covering a part of the opened side so as to leave an opening allowing protruding of the head of the clamping link out of the housing, and being shaped and sized not to interfere with the clamping link when the clamping link is moved from the first operating position to the second rest position or vice versa.

2. The clamping device as set forth in claim 1, wherein the housing is made of metal sheets, and has a shape of rectangular parallelepiped.

3. The clamping device as set forth in claim 2, wherein in each of two opposite side walls of the housing, an upper guide slot and a lower guide slot are formed, and the two upper guide slots and the two lower slots in opposite side walls of the housing are adapted to receive an upper guide pin and a lower guide pin coupled to the clamping link, respectively, so as to allow the two guide pins to slide therein.

4. The clamping device as set forth in claim 3, wherein the upper guide slot, the lower guide slot and the clamping link are designed such that, when the clamping link receives a force applied upwards to thus start moving upwards as a whole, with a cooperation between the guide pins and the guide slots, the head of the clamping link is moved to disengage with the hook part of the first portion; and when the clamping link receives a force applied downwards to thus start moving downwards as a whole, with the cooperation between the guide pins and the guide slots, the head of the clamping link is moved to engage with the hook part of the first portion.

5. The clamping device as set forth in claim 3, wherein the clamping link has a "Z" shape composed of a lower segment running vertically, a horizontal middle segment following the lower segment, and said head following the middle segment and running vertically upwards, and wherein the lower segment and middle segment are housed in the housing, and the head protrudes out of the housing to engage with the hook part.

6. The clamping device as set forth in claim 5, wherein the head has a "C"-shaped profile whose tip is to be engaged with the hook part.

7. The clamping device as set forth in claim 3, wherein the upper guide slot is formed as two straight segments jointed by a curved portion, one of the two straight segments being orientated vertically and the other extending outwards and upwards, and wherein the lower guide slot is formed as a vertically orientated slot.

8. The clamping device as set forth in claim 1, wherein the actuating means is a cylinder having a main body and an output member displaceable relative to the main body, one of the main body and the output member being connected to the housing and the other of the main body and the output member being connected to the clamping link so that the cylinder can operate to apply force to the clamping link.

9. The clamping device as set forth in claim 8, wherein the cylinder applies a clamping force in retraction.

10. The clamping device as set forth in claim 8, wherein the housing is provided with an access hole to provide passages for operating circuits or controlling means of the cylinder.

11. A clamping device for a mould having a first half part and a second half part, wherein the clamping device includes a first portion and a second portion coupled to the first and second half parts of the mould respectively, and the first portion is provided with a first engaging part, and the second portion has a second engaging part which is movable, by means of an actuating means, between a first operating position where the second engaging part is engaged with the first engaging part, and a second rest position where the second engaging part is disengaged with the first engaging part, and wherein the first portion and the second portion of the clamping device are coupled to a first member and a second member of a mould aligning device which are in turn coupled to the two half parts of the mould and are displaceable relative to each other.

12. A clamping device for a mould having a first half part and a second half part, wherein the clamping device includes a first portion and a second portion coupled to the first and second half parts of the mould respectively, and the first portion is provided with a first engaging part, and the second portion has a second engaging part which is movable, by means of an actuating means, between a first operating position where the second engaging part is engaged with the first engaging part, and a second rest position where the second engaging part is disengaged with the first engaging part, wherein the first engaging part is a pin, and the second engaging part has a clamping link with a hook, wherein the clamping link is movable, by means of the actuating means, between the first operating position where the hook is engaged with the pin, and the second rest position where the hook is disengaged with the pin, and wherein the second engaging part has a housing provided with upper and lower guide slots.

13. The clamping device as recited in claim 12, wherein the clamping link has upper and lower holes and two guide pins are inserted through the upper and lower holes of the clamping link and slide in the upper and lower guide slots respectively.

14. The clamping device as recited in claim 12, wherein neither of the guide slots is completely straight, and each comprises a straight portion joined to a curved portion.

15. The clamping device as recited in claim 12, wherein the actuating means is a hydraulic cylinder and the cylinder is mounted with the housing and thus is protected from paste and resin.

16. The clamping device as recited in claim 15, wherein the hook of the clamping link is shaped as curved ears to engage with the pin of the first engaging part and to allow the cylinder to be located proximal to the mould.

17. The clamping device as recited in claim 12, wherein the pin of the first engaging part is cantilevered therefrom.

* * * * *

UNITED STATES PATENT AND TRADEMARK OFFICE
CERTIFICATE OF CORRECTION

PATENT NO.        : 8,469,694 B2                                          Page 1 of 1
APPLICATION NO.   : 13/255950
DATED             : June 25, 2013
INVENTOR(S)       : Gabriel Mironov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 36 days.

Signed and Sealed this
Eighth Day of September, 2015

Michelle K. Lee
*Director of the United States Patent and Trademark Office*